(12) United States Patent
Tajiri et al.

(10) Patent No.: US 8,371,049 B2
(45) Date of Patent: Feb. 12, 2013

(54) RIPPER BLADE FOR USE ON HYDRAULIC ARM AND METHOD FOR STORAGE TANK DEMOLITION

(75) Inventors: Raymond Y. Tajiri, Honolulu, HI (US); Kenny Y. Tajiri, Honolulu, HI (US)

(73) Assignee: Tajiri Lumber Ltd., Honolulu, HI (US)

( * ) Notice: Subject to any disclaimer, the term of this patent is extended or adjusted under 35 U.S.C. 154(b) by 840 days.

(21) Appl. No.: 12/536,729

(22) Filed: Aug. 6, 2009

(65) Prior Publication Data

US 2010/0242701 A1  Sep. 30, 2010

Related U.S. Application Data

(62) Division of application No. 11/530,431, filed on Sep. 8, 2006, now Pat. No. 7,587,842.

(51) Int. Cl.
*E02F 9/28* (2006.01)

(52) U.S. Cl. .............................. 37/403; 37/466; 30/310

(58) Field of Classification Search .................... 37/403, 37/404, 466; 30/310, 380
See application file for complete search history.

(56) References Cited

U.S. PATENT DOCUMENTS

| | | | |
|---|---|---|---|
| 2,495,052 A | 1/1950 | Cole | |
| 3,497,016 A | 2/1970 | Ryan | |
| 3,704,753 A * | 12/1972 | Hasforth et al. | 172/700 |
| 3,706,207 A | 12/1972 | Cornelius | |
| 3,777,500 A | 12/1973 | Kelley | |
| 3,999,315 A * | 12/1976 | Nye | 37/459 |
| 4,044,838 A | 8/1977 | Wooldridge | |
| 4,129,934 A * | 12/1978 | Gettman | 29/426.2 |
| D255,797 S * | 7/1980 | Ryan | D15/11 |
| 4,321,970 A * | 3/1982 | Thigpen | 172/464 |
| 4,415,042 A | 11/1983 | Cosson | |
| 4,454,921 A | 6/1984 | Schlicker | |
| 4,517,755 A * | 5/1985 | Nicholson | 37/404 |
| 4,588,034 A | 5/1986 | Leonard | |
| 4,921,050 A | 5/1990 | Brown | |
| 5,409,068 A | 4/1995 | Hake | |
| 5,531,277 A | 7/1996 | Noonan | |
| 6,470,874 B1 | 10/2002 | Mertes | |
| 6,517,164 B1 * | 2/2003 | White | 299/37.5 |
| 6,764,139 B1 * | 7/2004 | Wortman | 299/10 |
| 7,059,072 B2 * | 6/2006 | Archuleta et al. | 37/468 |
| 7,445,053 B2 * | 11/2008 | Matsumoto et al. | 172/699 |
| 7,484,323 B2 * | 2/2009 | Morin | 37/404 |
| 7,587,842 B2 * | 9/2009 | Tajiri et al. | 37/195 |

* cited by examiner

*Primary Examiner* — Gary S Hartmann
(74) *Attorney, Agent, or Firm* — Leighton K. Chong

(57) ABSTRACT

A hydraulically-operated ripper tool mounted as an attachment on a hydraulic arm of a carrier or excavator is used for demolition of large metal walled structures such as storage tanks in a very short time. The ripper tool has a sharp point for punching entry holes into the tank walls, so that no torch cutting of entry holes needs to be used, particularly where there might be volatile residues left in the tank. The ripper tool has a concave, sharp inner edge and is operated by the hydraulic arm in reciprocation so as to provide a shearing force to cut quickly through metal walls in "can-opener" fashion. The ripper tool facilitates making long vertical cuts into the tank wall from top to bottom, so that a series of vertical cuts can be made to weaken a side of the tank and allow the top of the tank structure to be brought down.

8 Claims, 7 Drawing Sheets ically easy to operate and can also readily make starter holes in
RIPPER BLADE FOR USE ON HYDRAULIC ARM AND METHOD FOR STORAGE TANK DEMOLITION This divisional U.S. Patent Application claims the benefit of the priority filing date of U.S. patent application Ser. No. 11/530,431, filed on Sep. 8, 2006, by the same inventors, now issued as U.S. Pat. No. 7,587,842.

TECHNICAL FIELD

This invention relates to hydraulically-powered equipment and tools for heavy construction work, and particularly, to equipment and a method for storage tank demolition.

BACKGROUND OF INVENTION

Industrial storage tanks are widely used to store liquid fuels, chemicals, feed stocks, slurries, aggregates, etc. Such structures can be many stories in height, e.g., 50 feet high, several hundred feet in circumference, and made of steel, metal, or other construction materials of high thickness and tensile strength. The storage tanks can be assembled relatively easily by welding together steel or metal plates in ground-up construction. However, when such storage tanks have outlived their use, they need to be demolished and cut into smaller pieces for transport to landfill, waste, scrap, or recycling facilities. Demolition of such storage tanks is a difficult and dangerous task due to the need to take down a very large, heavy structure of high rigidity and strength.

Currently, a typical tank demotion process requires cutting or punching entry holes in the tank walls at locations around the tank, then laboriously snipping, shearing, cracking, or pulverizing cuts down the tank walls using a hydraulically-operated jaw or shear attachment operated on the end of a hydraulic arm of a heavy carrier or excavator vehicle. As examples, such hydraulically-operated jaws or shears are sold by The Stanley Works, LaBounty Division, of Two Harbors, Minneapolis, under the designation MSD Mobile Shears. However, such hydraulic jaws or shears can cut in bites of only 6 to 12 inches at a time, making it extremely laborious to make long cuts down tank walls many stories in height and repetitively at intervals over hundreds of feet of tank circumference. A typical tank 50 feet in height and 600 feet in circumference could take 30 to 40 hours of work using hydraulic jaws or shears to take it down. In some cases, due to volatile residues of storage material in the tank, the cutting of entry holes in the metal tank walls with flame or electric arc torches cannot be used, making it more difficult to create starter holes.

It would therefore be highly desirable to have improved equipment and a method for demolition of large storage tank structures, particularly those made of steel or metal walls, in a quicker, less labor-intensive manner, and which is mechanically easy to operate and can also readily make starter holes in the tank walls as part of the take-down process.

SUMMARY OF INVENTION

In accordance with the present invention, a hydraulically-operated ripper tool is provided for demolition of large tank structures having tank walls of metal or other rigid construction material. The ripper tool has a mounting portion for mounting as an attachment on an end of a hydraulic arm of carrier or excavator equipment so that it can be hydraulically reciprocated with a hooking motion over a given range of rotation, and a ripper blade having a shank portion fixed to the mounting portion and a blade portion extending from the shank portion having a sharp inner edge extending along a concave curved arc to a sharp point providing an inclined angle of attack relative to the shank portion, wherein the sharp point at the end of the blade portion provides a point of attack for punching a hole into tank walls and the concave, sharp inner edge provides a shearing force for cutting through tank walls.

The present invention also encompasses a novel method of using the ripper tool on a hydraulic arm of a carrier or excavator to take down a large storage tank structure for demolition. The ripper blade is mounted by its shank mounting to the end of the hydraulically-operated arm of the excavator. The hydraulic arm is movable upward and downward on a boom of the excavator. The ripper blade is movable with a hooking motion by a hydraulic drive of the arm. The hydraulic arm is rotated upward to an upper end of its vertical range, and the ripper blade is positioned so that the point of the blade is aimed in a horizontal direction to make a forward thrust to punch an entry hole into a top part of the tank wall. The hydraulically-operated arm (and boom) is pulled downward while keeping the ripper blade positioned on the vertical cut being made in the tank wall. As the ripper blade descends through the cut, it is reciprocated up and down in a series of hooking motions so as to apply a shearing force to cut through the metal plate of the tank wall in a "can-opener" fashion. In this manner, a long vertical cut can be ripped into the tank wall from the top to a lower part of the wall. A series of vertical cuts can be made in swathes into one side of the tank walls in order to weaken the side of the tank. The weakened side can then be collapsed inward to bring the top of the tank structure down on that side. Similar vertical cuts in swathes can be made to collapse the other side or sides of the tank. Using the ripper tool in this manner, a tank 50 feet in height and 600 feet in circumference can be taken down in 3 to 4 hours, or in about one-tenth the time it would take to do the same task with hydraulic jaws or shears.

Other objects, features, and advantages of the present invention will be explained in the following detailed description of the invention having reference to the appended drawings.

DETAILED DESCRIPTION OF INVENTION

In the following detailed description of the invention, certain preferred embodiments are illustrated providing certain specific details of their implementation. The following example describes a ripper tool used for demolition of a metal storage tank without torch cutting by operation on a hydraulic arm of a preferred type of excavator equipment. However, it will be recognized by one skilled in the art that many other variations and modifications may be made given the disclosed principles of the invention.

Figure 1:
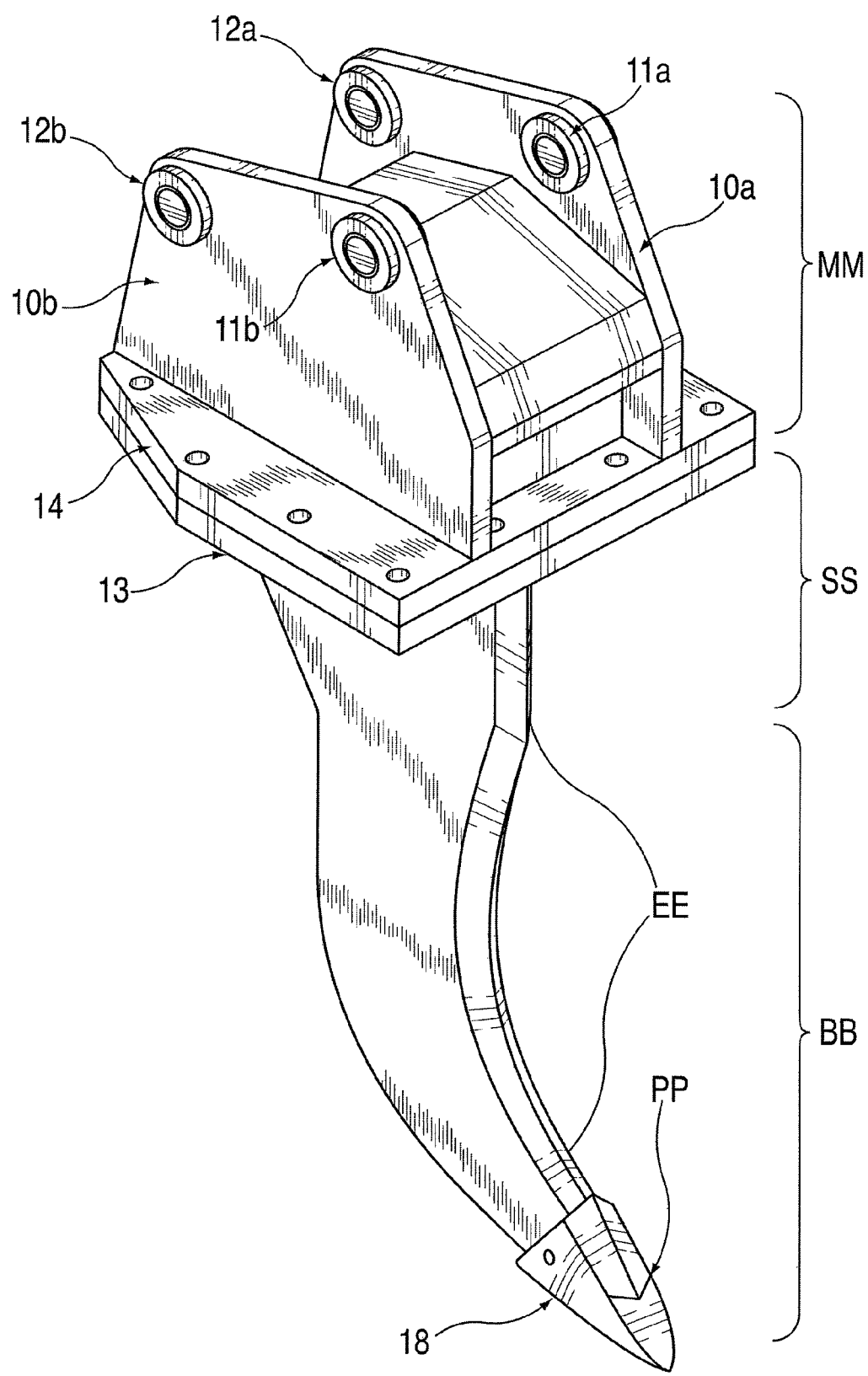
FIG. 1 shows a perspective view of a preferred embodiment of the ripper tool for storage tank demolition in accordance with the invention.

FIG. 1 shows a perspective view of a preferred embodiment of the ripper tool for storage tank demolition in accordance with the invention. The ripper tool has a mounting portion MM for mounting at the end of the hydraulically-operated arm of the excavator equipment. The mounting portion MM has a pair of thrust plates 10a, 10b, having mount bearing holes 11a, 11b, and thrust bearing holes 12a, 12b formed therein. As explained in detail below, the mount bearing holes 11a, 11b are used to mount the tool attachment to the end of the hydraulic arm of the excavator equipment, and the thrust bearing holes 12a, 12b are used to connect the tool to the thrust piston of the arm hydraulic drive for the attachment so that the ripper tool can be rotated through a hooking range of motion. The ripper tool has a blade portion including a shank portion SS that is welded to the shank plate 13. The shank plate 13 is bolted to the mounting plate 14 of the mounting portion MM in abutting, rigid contact with each other. The blade portion has a ripper blade BB extending from the shank portion SS with a sharp inner edge EE extending along a concave curved arc to a sharp point PP. In this embodiment, the sharp point PP has a sheath element 18 as a replaceable piece that sleeves onto and fastened to the end of the ripper blade BB. Also, the shank portion SS is made removable from the mounting portion MM to facilitate replacement when it has become worn or is to be changed.

In this example, a CAT235™ excavator from Caterpillar Inc., of Peoria, Ill., is used having an operating weight of about 95,000 pounds, with an undercarriage of standard track type. The ripper tool has a weight of about 4,700 pounds. The maximum vertical height of the excavator's arm/stick and boom is about 40 feet. The excavator's diesel engine has a rating of 250 flywheel hp. The hydraulic system supplies about 250 hp to the prime mover and implements. The ripper blade is flame cut from T1 high-strength alloy plate, which is made of carbon steel and rated for 90,000 to 100,000 pounds of tensile strength. However, it can also be molded or forged in suitable circumstances. The storage tank to be demolished is about 50 feet high and 600 feet in circumference. The tank walls are made of welded steel plates of about 0.375 inch thickness at the top and increasing to about 0.750 inch thickness at the bottom.

Figure 2A:
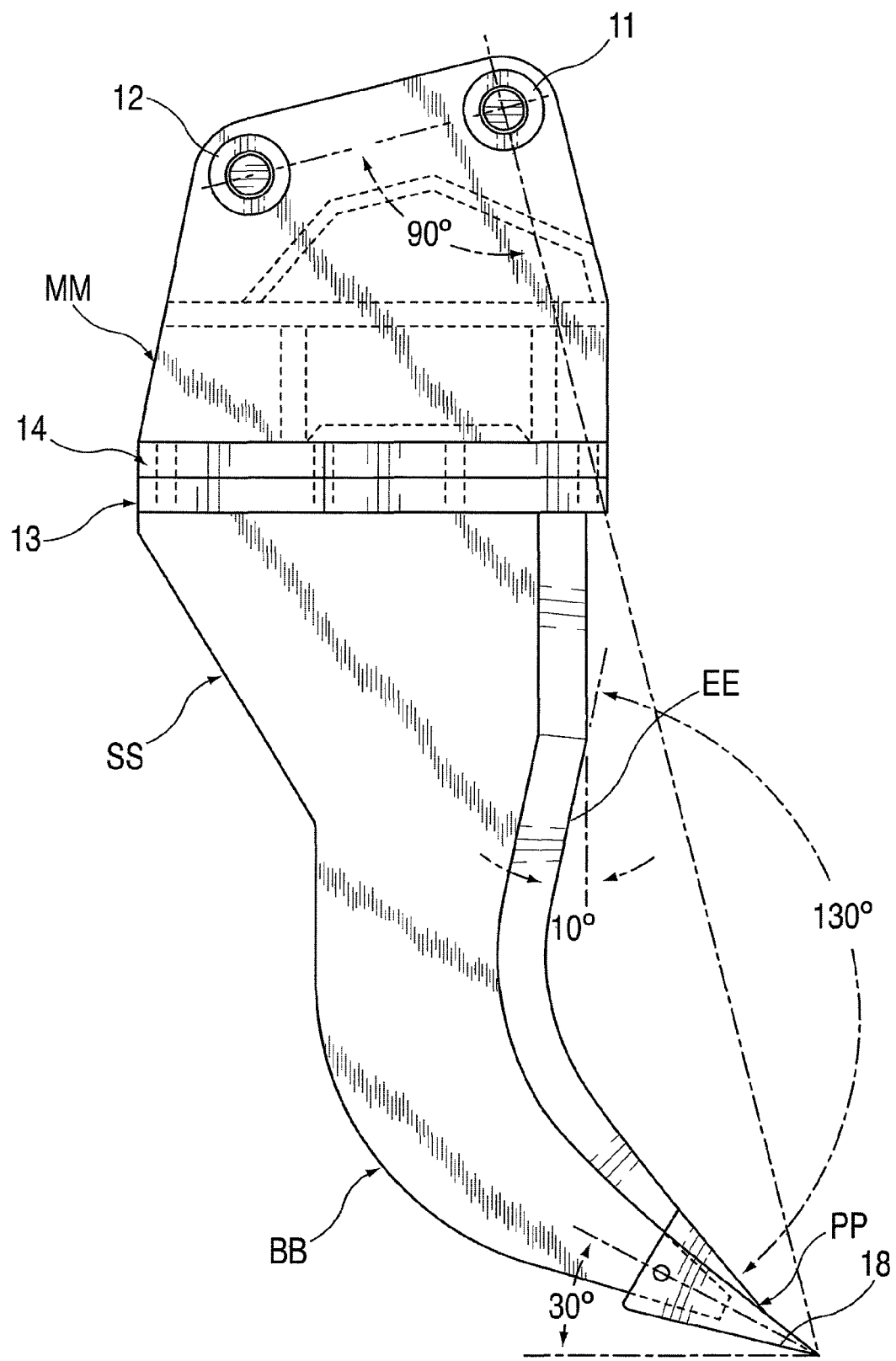
FIG. 2A shows the ripper tool in side view.
Figure 2B:
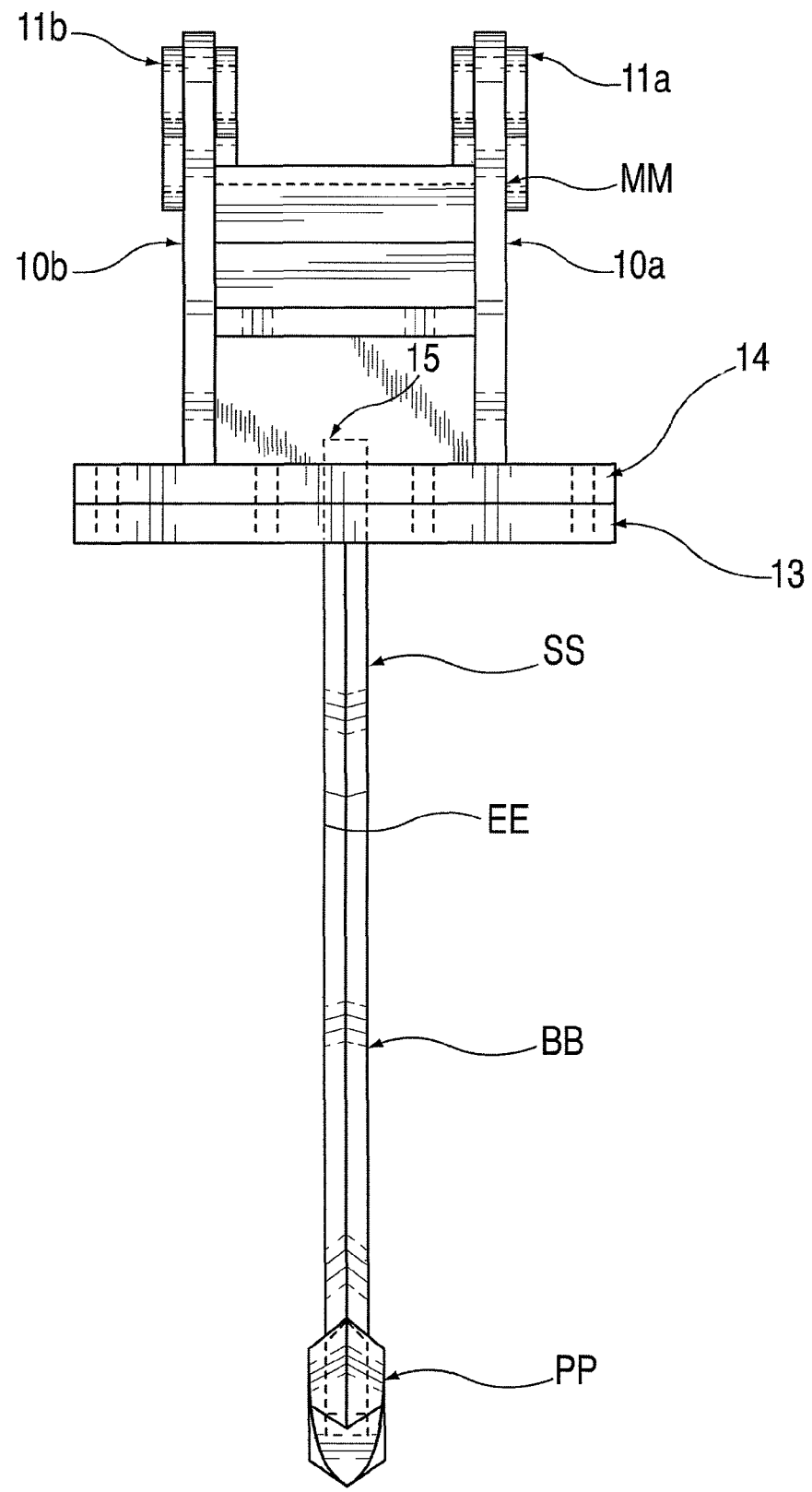
FIG. 2B shows a front view, for greater detail.

FIG. 2A shows the ripper tool in side view, and FIG. 2B shows a front view, for greater detail. In this example of the tool, adapted for the hydraulic arm of the Cat-235™ excavator, the mount bearing holes 11 and thrust bearing holes 12 in the thrust plates 10a, 10b are spaced about 20 inches apart, and accommodate 3-inch diameter pins for mounting to the hydraulic arm end. The mount bearing holes 11 form an angle of 90° to the tip of blade point PP relative to the line between bearing and thrust holes, for applying maximum thrust force to the point. The thrust plates 10a, 10b, inner sections, mount plate 14, and shank plate 13 is preferably formed of high-strength Lo alloy plate, to ASTM 572 GR 50 standard. The shank portion of the ripper tool has an ear 15 projecting from its upper end that is inserted through a slot in the shank plate 13 when the shank portion is welded thereto, and also extends through a matching slot in the mount plate 14 when the shank plate is bolted to the mount plate 14.

The shank portion SS of the ripper tool tapers from a width of about 33.5 inches where it is coupled to the shank plate 13 to about 17.5 inches where it extends into the blade portion BB. Preferably, the shank and blade portions are formed from a single, T1 high-strength alloy plate, to ASTM A514 standard. The inner edge of the shank and blade portions is formed as a sharp edge EE which may have a line thickness of 0.188 inch, for example, as compared to a 3-inch plate thickness. The sharp edge EE can be dimensioned about 3.5 inches in the widthwise direction (lateral direction in plan view) at the shank and blade portions, then tapering toward the point PP. The replaceable sheath element 18 covering the point PP is also fabricated from T1 plate.

The sharp inner edge extends from the shank portion SS along a generally concave curved arc of the blade portion BB to the point PP. For example, the curved arc can incline inward from the shank portion about 10° then form about 130° of concave curvature where it comes to the point PP. The point PP thus forms an inclined angle of attack of about 30° relative to the shank/mount plate line, or about 45° relative to the axis between the mount bearing holes 11 and the tip of the point PP. The inclined angle of attack and concave curvature can span a broader range of angles, depending on the configuration of the hydraulic arm and excavator equipment.

Figure 3:
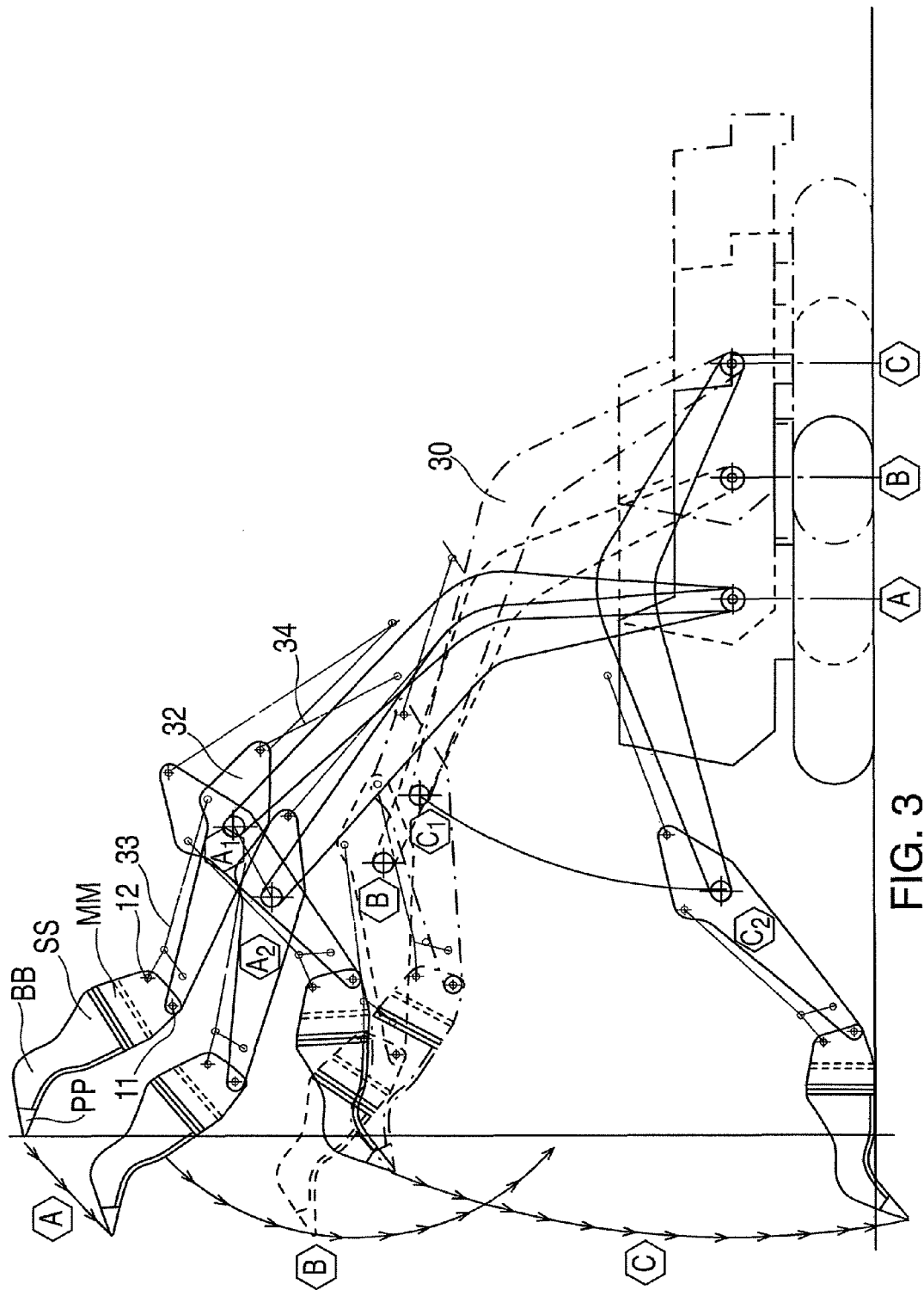
FIG. 3 illustrates the novel method of using the ripper tool to take down a large storage tank structure for demolition.

FIG. 3 illustrates the novel method of using the ripper tool to take down a large storage tank structure for demolition. The ripper blade BB is mounted by its mounting portion MM to the end of an arm/stick 32 articulated on a boom 30 of a carrier or excavator vehicle CAT. The end of the arm stick is coupled by pins through the mount bearing holes 11, and the hydraulic drive 33 for rotating the hook motion of the arm attachment is coupled by pins through the thrust bearing holes 12. In this manner, the ripper blade BB can be rotated with a hooking motion by the hydraulic drive 33. The arm/stick 32 is driven by the hydraulic drive 34 in rotation upward or downward, and the boom 30 is driven by its boom hydraulic drive.

In the tank demolition method illustrated in FIG. 3, the hydraulically-operated arm 32 is rotated upward on the boom 30 to an upper end of its vertical range and the ripper tool BB is rotated upward to an upper end of its hooking range by the hydraulic drive 33 so that the point PP of the blade BB is aimed in a generally horizontal direction to make a forward thrust at the tank wall line to punch an entry hole into a top part of the tank wall. The hydraulically-operated arm 32 and boom 30 are pulled downward as the excavator is edged backwards from the tank wall line to keep the ripper blade positioned on the vertical cut being made in the tank wall. A series of ripper blade positions A, B, C corresponding to the excavator positions A, B, C is shown in the figure. As the ripper blade descends through the cut, it is reciprocated up and down in a series of hooking motions (indicated by the series of arrows over the ripper blade positions in the figure) so as to apply a shearing force to cut through the metal plate of the tank wall in a "can-opener" fashion. In this manner, a long vertical cut can be ripped into the tank wall from the top to a lower part of the wall.

Figure 4:
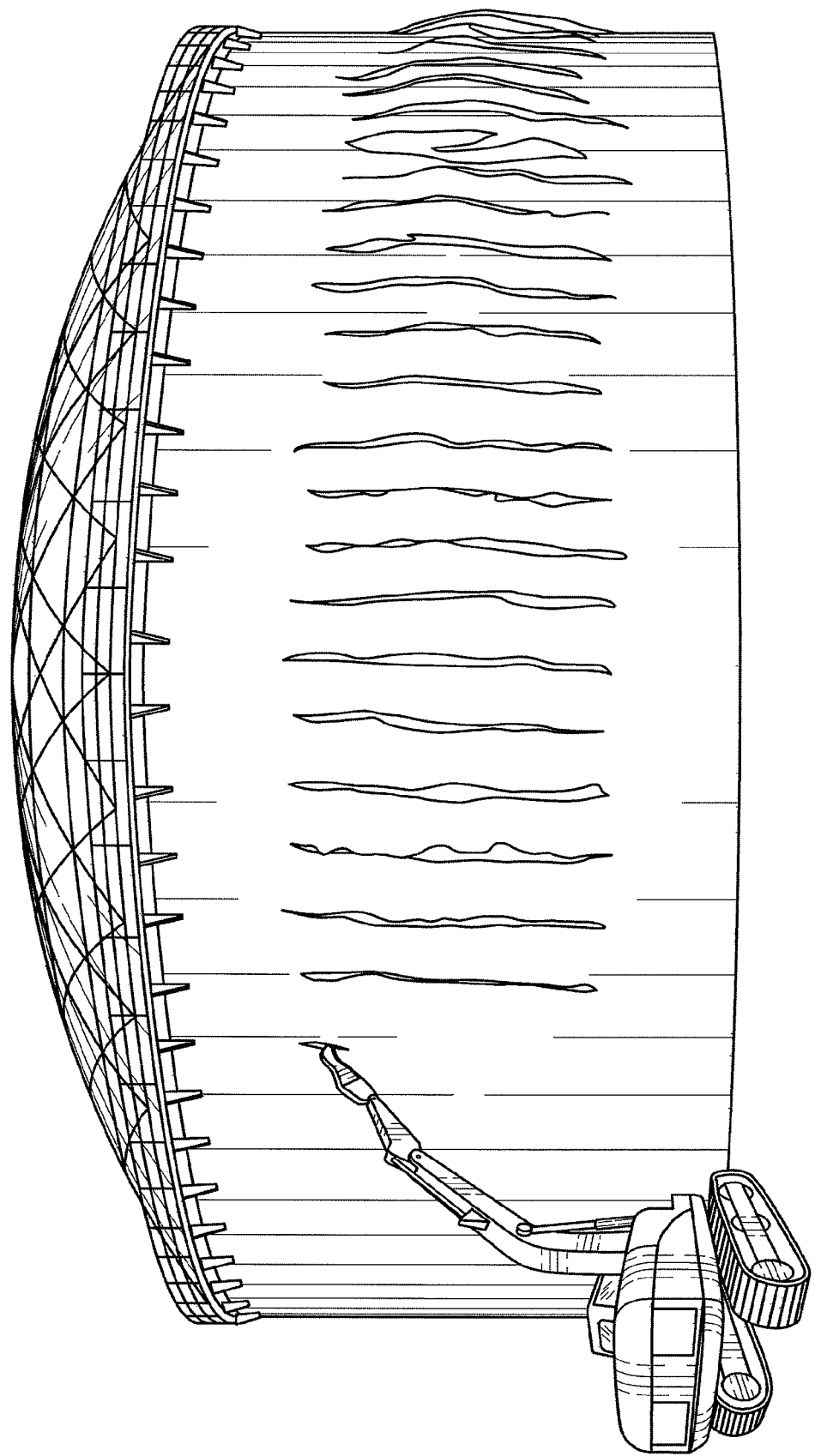
FIG. 4 illustrates the tank demolition method of the invention in which the ripper tool is used to make a series of vertical cuts into one side of a tank to weaken it.
Figure 5:
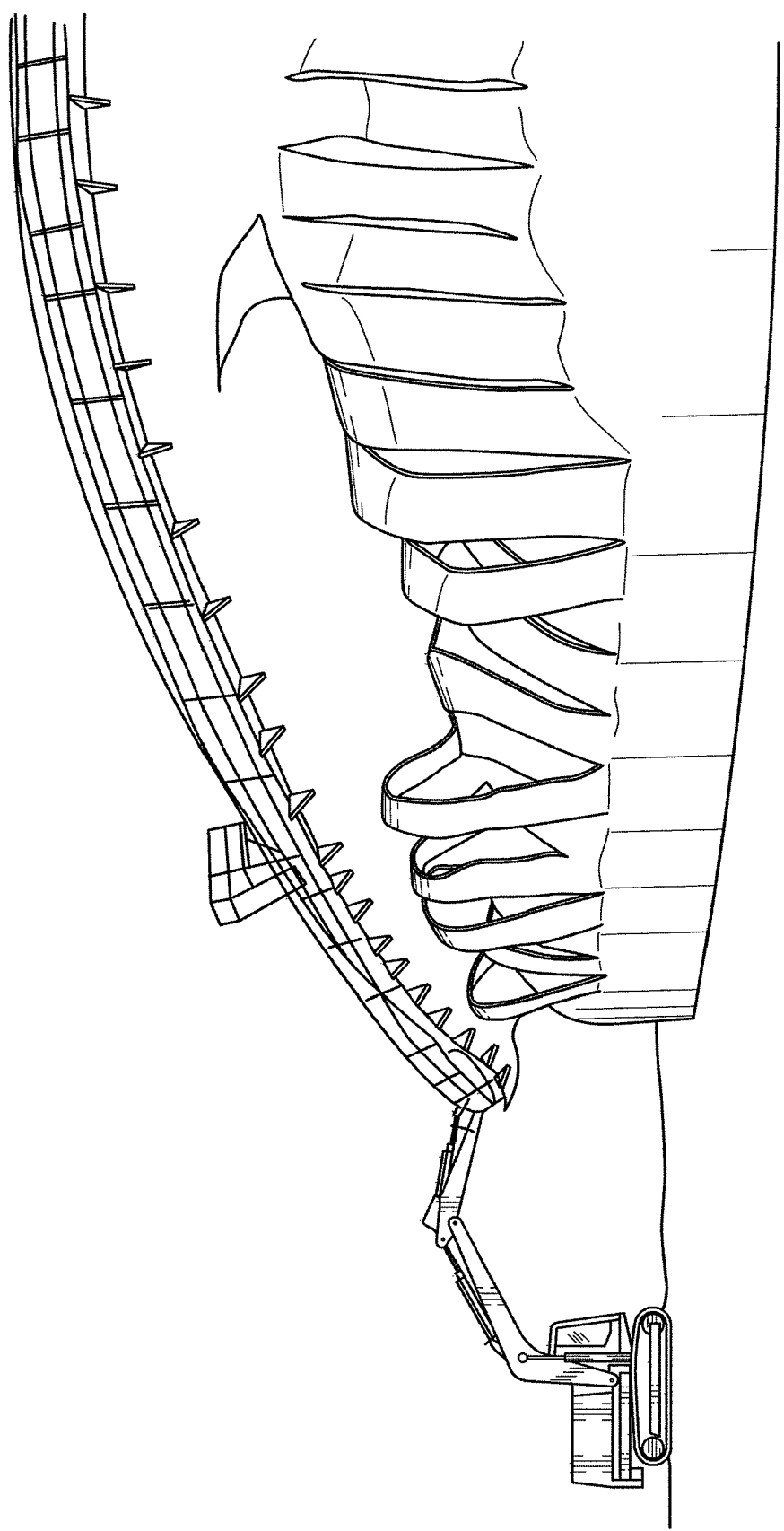
FIG. 5 shows the step of collapsing the weakened side of the tank to bring the top of the tank structure down on the weakened side.
Figure 6:
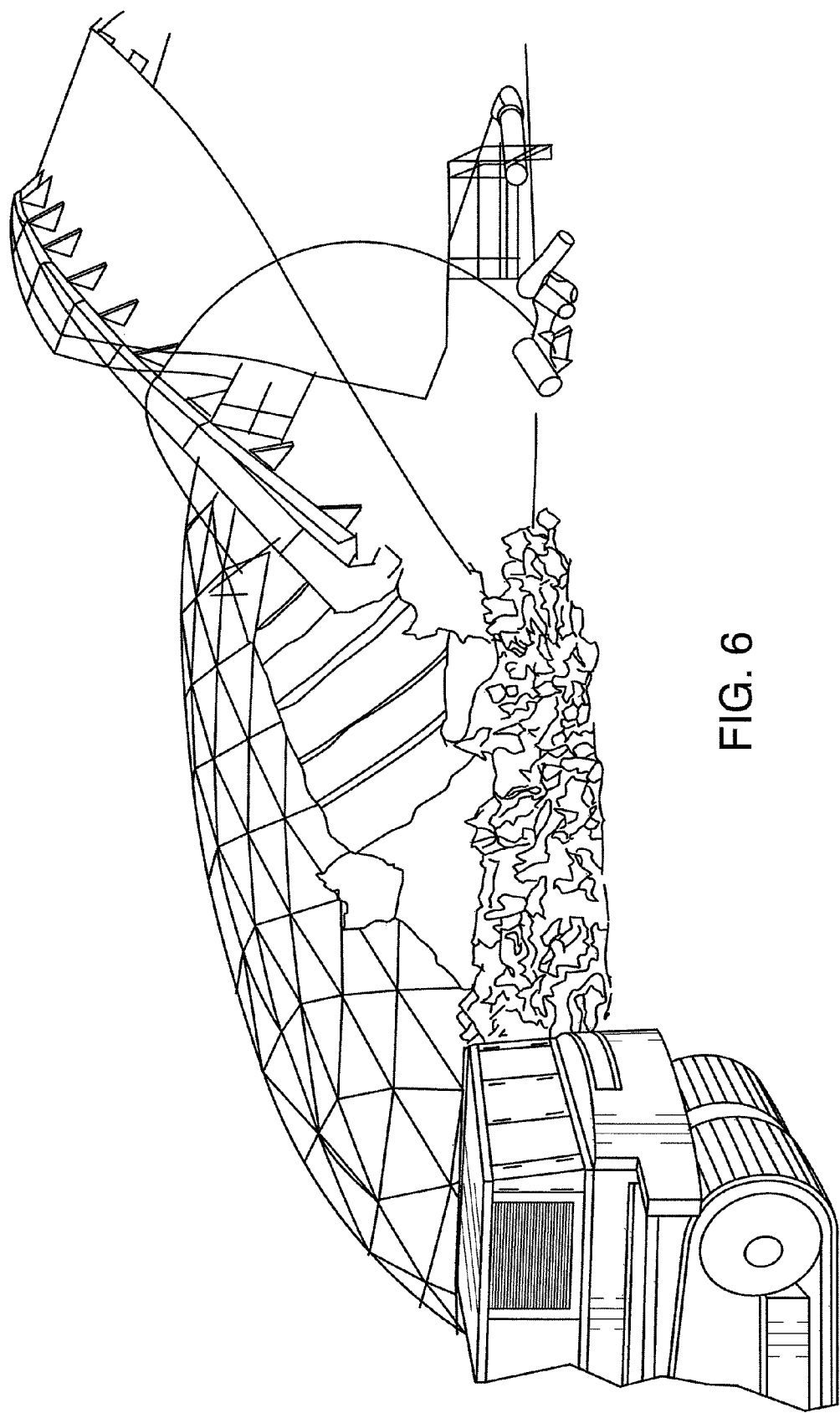
FIG. 6 shows the collapsing of the other sides of the tank until the tank structure is taken down.

As illustrated in FIG. 4, the tank demolition method can be performed quickly and efficiently using the following series of steps. First, a series of vertical cuts are made in swathes into one side of the tank walls in order to weaken the side of the tank. The cuts are made about 2 to 3 feet apart in this example, but can be farther apart for tanks that are smaller and/or have thinner wall thicknesses. As shown in FIG. 5, the weakened side of the tank can then be collapsed inward to bring the top of the tank structure down on that side. Similar vertical cuts in swathes can be made to collapse the other side or sides of the tank, until the tank has been taken down, as shown in FIG. 6. Using the ripper tool in this manner, a tank 50 feet in height and 600 feet in circumference can be taken down in 3 to 4 hours, or in about one-tenth the time it would take to do the same task with hydraulic jaws or shears. Once the tank structure has been taken down to the ground, it can be cut up into smaller pieces with hydraulic shears or other cutters for transport away. The cuts in the tank walls can be made to suitable widths to facilitate cutting into smaller pieces and transport away for disposal.

In summary, the present invention provides a hydraulically-operated ripper tool that can be used for demolition of large tank structures in a much shorter time. The ripper tool has a sharp point for punching entry holes into the tank walls, so that no torch cutting of entry holes needs to be used, particularly where there might be volatile residues left in the tank. The ripper tool has a concave, sharp inner edge and is operated by the hydraulic arm in reciprocation so as to provide a shearing force to cut quickly through metal walls in "can-opener" fashion. The ripper tool facilitates making long vertical cuts into the tank wall from top to bottom, so that a series of vertical cuts can be made to weaken a side of the tank and allow the top of the tank structure to be brought down. Using the ripper tool in this manner, a large tank can be brought down in about one-tenth the time it would take to do the same task with hydraulic jaws or shears.

It is understood that many modifications and variations may be devised given the above description of the principles of the invention. It is intended that all such modifications and variations be considered as within the spirit and scope of this invention, as defined in the following claims.

The invention claimed is:

1. A hydraulically-operated ripper tool for attachment on a hydraulic arm of carrier or excavator equipment for use in demolition of metal walled structures, comprising:
   (a) a mounting portion for mounting on an end of a hydraulic arm of carrier or excavator equipment such that the tool can be reciprocated by the hydraulic arm with a hooking motion over a given range of rotation, and
   (b) a ripper blade having a shank portion fixed to the mounting portion and a blade portion extending from the shank portion having a sharp inner edge extending along a concave curved arc to a sharp point, wherein the sharp inner edge is inclined inward along the curved arc from the shank portion about 10° then forms about 130° of concave curvature where it comes to the sharp point, thereby providing an inclined angle of attack relative to the shank portion which is capable of generating a shearing force on an object of attack when the ripper blade is pulled in a downward direction from the shank portion, and wherein the sharp point at the end of the blade portion provides a point of attack for punching a hole into a metal wall, and the concave, sharp inner edge is capable of providing a shearing force for cutting through the metal wall.

2. A hydraulically-operated ripper tool according to claim 1, wherein said mounting portion has a pair of thrust plates provided with mount bearing holes to mount the tool to the end of the hydraulic arm, and thrust bearing holes to connect the tool to the arm's hydraulic drive.

3. A hydraulically-operated ripper tool according to claim 1, wherein the sharp point is provided with a sheath element that sleeves onto and is fastened onto the end of the blade portion.

4. A hydraulically-operated ripper tool according to claim 2, wherein the mount bearing holes form an angle of 90° to the tip of blade point relative to a line between the mount bearing and thrust bearing holes.

5. A hydraulically-operated ripper tool according to claim 1, wherein the shank and blade portions are formed from a single, T1 high-strength alloy metal plate.

6. A hydraulically-operated ripper tool according to claim 1, wherein the point forms an inclined angle of attack of about 30° relative to a transverse direction of the shank portion.

7. A hydraulically-operated ripper tool according to claim 2, wherein the point forms an inclined angle of attack of about 45° relative to an axis between the mount bearing holes and the tip of the point.

8. A hydraulically-operated ripper tool according to claim 1, wherein an assembly of the mounting portion and ripper blade weighs in a range of about 4,700 pounds.

* * * * *